Figure 1:
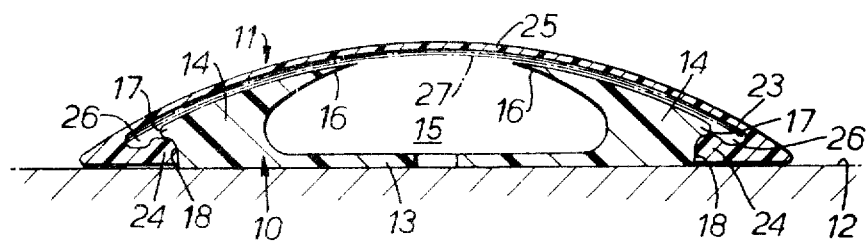

United States Patent [19]

Owen

[11] 4,258,515

[45] Mar. 31, 1981

[54] CONDUIT TRUNKING

[76] Inventor: William J. Owen, Park Pl., Beaufort, Ebbw Vale, Gwent, Great Britain

[21] Appl. No.: 942,897

[22] Filed: Sep. 13, 1978

[30] Foreign Application Priority Data

Sep. 13, 1977 [GB] United Kingdom ............ 38078/77

[51] Int. Cl.³ .................... E04F 19/02; H02G 3/26
[52] U.S. Cl. .................................. 52/105; 52/221; 52/288; 174/101; 174/68 C; 138/104; 138/106
[58] Field of Search ............... 52/221, 287, 716, 718, 52/242, 104, 105, 420, 22, 288; 174/68 C, 70 C, 95, 97, 101; 138/103, 104, 108, 162, 166, 106

[56] References Cited

U.S. PATENT DOCUMENTS

| 1,714,174 | 5/1929 | Lichtenberg et al. ............ 52/105 |
| 2,297,887 | 10/1942 | Hall et al. ............................ 52/718 |
| 3,173,826 | 3/1965 | Campbell et al. ............... 52/420 |
| 3,321,878 | 5/1967 | Brown et al. ...................... 52/287 |
| 3,903,626 | 9/1975 | Ford .................................... 52/104 |

FOREIGN PATENT DOCUMENTS

| 1317930 | 1/1963 | France ............................. 52/287 |
| 323832 | 1/1930 | United Kingdom ............ 52/718 |

*Primary Examiner*—James L. Ridgill, Jr.

[57] ABSTRACT

Extruded plastic trunking to cover, conceal, and protect cables or conduits on the surfaces of building walls, comprising a base strip with a channel groove to accommodate the conduit or cable and an overlying resilient curved cover strip arranged to make a snap fit with the base, having sloping flanks which extend close to the wall. The cover strip may be transparent and provided with a lining strip of the same pattern and color as the wall surface.

8 Claims, 6 Drawing Figures

CONDUIT TRUNKING

This invention relates to trunking intended to receive and conceal one or more elongated cables, pipes, conduits or the like on exposed surfaces of walls, architraves, panels or other building or architectual fittings.

It is an object of the invention to provide an improved trunking of this general type which will provide various advantages particularly in improved appearance and the ability to be converted readily from one style of decoration to another. It is of course well appreciated that the appearance and general decor of a room can be disturbed or ruined by unsightly cables or pipes which are installed after the mounting surface has been painted, papered or otherwise decorated. The present invention provides an improved trunking system having a number of features which provide a considerable degree of flexibility and makes the trunking adaptable to decorative finishes of many types.

Broadly stated from one aspect the invention consists in a trunking of the type referred to above in which the cover is at least partly transparent. It is then possible to provide one of a number of different finishes behind the transparent portion of the cover, to suit the surrounding decor. Preferably the cover will include means to retain a strip of paper or other decorative material in position behind the transparent portion.

For ease of installation it is preferred that the trunking should be supplied complete with a plurality of strips of material of different colours, patterns or textures. It is then merely necessary to select the most appropriate strip, or side of the strip, and insert it behind the transparent part of the cover accordingly.

It is also preferred that the width of the cover should be approximately equal to the developed arcuate length of the locating formation to receive a strip of the material. This provides a convenient method for marking out a strip on the existing wallpaper, which can then be dampened and removed from the wall and inserted behind the transparent portion of the cover so that the cover will actually take on the appearance of the surrounding wallpaper.

The base of the trunking is conveniently an extruded plastics part of channel cross-section formed with means to locate cables or conduits at least temporarily in position until the cover is fitted. For example, the base may have resilient flanges or webs projecting from the opposite sides of the channel and extending inwardly towards one another so that a cable or conduit can be inserted into the channel and will then be retained. If these wings or webs project outwards from the base they are also of value in holding the strips of coloured material in position below the transparent part of the cover.

According to another preferred feature of the invention the cover has curved or sloping flank surfaces, and the sides of the cover are formed to meet the wall or other mounting surfaces. The curved or sloping flank surfaces are of value in that the trunking is less noticeable on the supporting mounting surface and also it enables the trunking to be covered over with wallpaper or the like, if so desired. Since the sides of the cover extend close up to the wall there will be little if any gap and if the appearance of the cover matches that of the wall the trunking will be unnoticeable or at least well camouflaged.

The cover may be attached to the base in various different ways but in a preferred form of the invention both are constructed of a resilient synthetic plastics material and are shaped to engage each other with a snap action to permit ready attachment or removal of the cover.

It is also preferred that the base should have a prepared back surface provided with a layer of adhesive and is also preformed with apertures or fastenings, as an additional or alternative mounting means. Moreover the base may be provided also with apertures or markings to facilitate alignment with features on the mounting surface. For instance, it may be required that the trunking should be accurately positioned on a line drawn on the wall but in such a position that it will be covered by the base of the trunking when installed. By providing locating apertures in the base it is possible to line up the base with the underlying marking before it is finally fixed.

Figure 2:
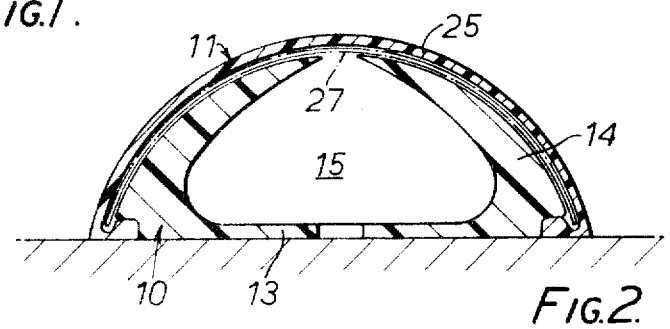
Figure 3:
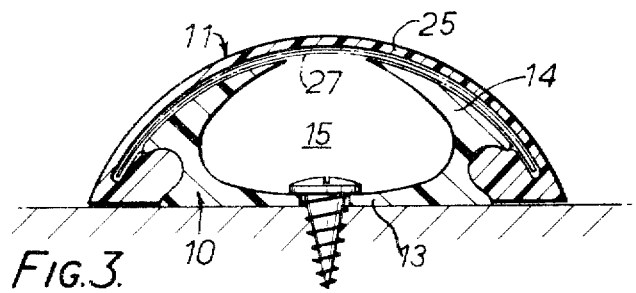
Figure 4:
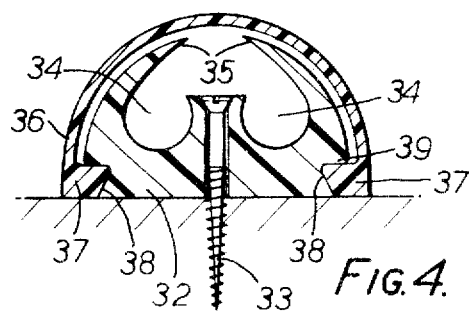
Figure 6:
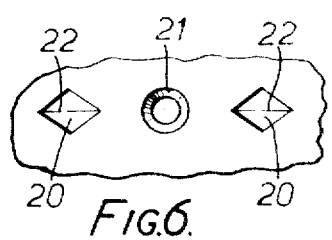
Figure 5:
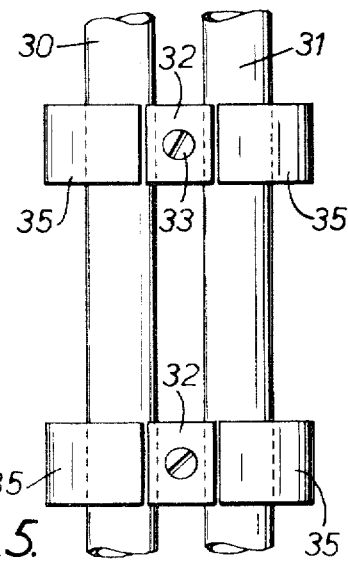

The invention may be performed in various ways and some specific embodiments will now be described by way of example with reference to the accompanying drawings, in which:

FIG. 1 is a cross-sectional view on a somewhat enlarged scale through one form of trunking in accordance with the invention designed primarily to receive electrical cables, FIG. 2 is a similar cross-section view illustrating another possible form of the invention, FIG. 3 is a similar view illustrating another embodiment, FIG. 4 is a similar view illustrating one of a number of clips with an overlying cover suitable for use in locating twin small bore fluid pipes as used for central heating, FIG. 5 is a front view illustrating how such clips are used to locate the pipes, and FIG. 6 is a diagram illustrating the construction of locating apertures in the base of a trunking member.

Referring first to FIG. 1, the trunking there illustrated consists of a base 10 and a cover 11. The base is designed to be mounted on a flat surface 12 which may for example be an internal wall of a building and which is normally already in a painted or otherwise decorated state. For example it may be wallpapered.

The base of the trunking is formed as an elongated extrusion of a synthetic plastics material such as P.V.C. and it includes a flat mounting web 13 provided with two upstanding ribs or flanges 14 along opposite edges, defining a central channel 15 in which the electric cables are to be positioned. To assist in holding the cables temporarily in position before the cover is applied each of these ribs 14 is formed with a thin lip or extension 16 which is somewhat resilient and allows the cables to be pressed inwards into the channel 15. Each of the ribs 14 is formed on its external surface with a projecting shoulder 17 and a somewhat undercut groove 18 to receive and locate the cover 11 as will be described below. The backing web 13 of the base is formed with a number of spaced apertures to receive fastening screws or other fastening elements and in addition the base may have diamond-shaped windows 20 on opposite sides of each screw hole 21 to allow the base to be lined up accurately with a pencil line 22 or other marking previously applied to the wall surface 12. In addition the back of the base is preferably provided with a prepared adhesive coating. This may be, for example, an adhesive of the impact type initially protected by a layer of waxed paper or the equivalent which can be peeled off when the adhesive is to be used.

The cover 11 is also formed as an extrusion of a synthetic plastics material and is of a relatively high grade transparent plastics by comparison with the base, which may be formed of a relatively cheap black P.V.C. The cover is curved and the flank surfaces 23 would preferably extend down to and meet the wall 12. The shallow curved arc as illustrated in FIG. 1 makes the trunking inconspicuous on a wall and also allows wallpaper to be laid over the trunking after it has been installed without any unsightly sharp edges. Along each edge of the cover there is formed an inward rib 24 designed to fit into the corresponding groove or recess 18 in the base and to lock behind the projecting shoulder 17 on the base. The operative surfaces of the rib 24, the groove 18 and the shoulder 17, are such that the cover strip can readily be snapped into position as shown over the base and can also be readily removed either by applying manual pressure at the centre of the cover strip or by means of a special tool inserted behind the lip of the cover.

According to a particular preferred feature of the invention the cover is designed to receive and locate one or more strips of decorative material behind its transparent front wall 25. For this purpose a groove 26 is formed along each internal edge of the cover so as to locate the opposite edges of a coloured paper strip which may be inserted in the position illustrated in dotted lines at 27. Since the cover is transparent it will be apparent that the colour or pattern or texture of the trunking can be altered at will by replacing the strip 27. To facilitate such selection it may be arranged that the cover strip of the trunking is supplied with a number of different coloured paper strips in position in the grooves 26 so that it is only necessary to select the strip required.

A further desirable result can be achieved that by removing a thin strip of the existing wallpaper and inserting this in the grooves 26 of the cover, the trunking may be made to resemble the surrounding wallpaper, thus becoming substantially invisible. For this purpose the overall natural width of the cover from edge to edge is preferably so selected that it will be approximately equal to the developed arcuate length of the paper strip 27 mounted between the two grooves 26. It is then possible to use the cover as a template to mark out two lines on the existing wallpaper from which the existing paper can then be cut and removed to be inserted behind the transparent cover.

FIGS. 2 and 3 illustrate further examples of the invention which are substantially identical with that of FIG. 1 in function, but differ primarily in details of design.

In the embodiment of FIGS. 4 and 5 the trunking system is applied to the installation of small bore water pipes 30, 31 as used for example in domestic central heating. In this trunking system the continuous base 10 of the first embodiment is replaced by a series of spaced clips 32 designed to be mounted independently and individually at intervals along the line of the pipes on the wall. Each clip is conveniently formed of plastics material and is provided with an aperture or drilling to receive a mounting screw 33 and a pair of recesses or sockets 34 to accommodate the two pipes. In addition the clip has a pair of inwardly projecting flexible wings 35 to hold the pipes temporarily in position for the same reasons as described above.

In this example the cover 36 is also formed of a synthetic plastics material and as in the previous example it has a curved profile and is designed to extend down to meet the surface of the wall on which the pipes are mounted. The cover has inwardly projecting ribs 37 along each edge designed to engage locating grooves 38 formed in the base clips. In addition the cover has internal shoulders 39 formed to receive the edges of a decorative paper strip (not illustrated) for the same purpose as described in the example above. This example differs primarily in that the base is not continuous but in other respects most of the features are similar.

It will be appreciated that the invention can readily be applied to a wide variety of different purposes, and particularly to locating and concealing water pipes, gas pipes, telephone cables, alarm bell wiring circuits and in general any elongated objects to be mounted on a wall or other surface.

I claim:

1. Trunking to receive and conceal elongated members on an exposed surface, comprising an elongated base provided with means for attachment to said exposed surface, the base having means for retaining said members temporarily in position thereon, and a transparent cover provided with means for securing a strip of material within said cover to be visible externally, and means for securing said cover as a releasable snap fit to said base so as to form an enclosed elongated duct, the outer flank surfaces of said cover being inclined towards and substantially meeting said exposed mounting surface.

2. Trunking according to claim 1, mounted on and attached to an exposed wall surface, in combination with electric cables mounted and concealed within said duct formed by said base and cover.

3. Trunking according to claim 1, in combination with a plurality of strips of material of different colours, patterns or textures.

4. Trunking according to claim 1 in which the width of the cover is equal to the developed arcuate length of the locating formation to receive a strip of the material.

5. Trunking according to claim 1, in which the cover and/or the base are formed of a resilient synthetic plastics material.

6. Trunking according to claim 1, in which the base has a prepared back surface provided with a layer of adhesive and is also preformed with apertures, as an alternative mounting means.

7. Trunking according to claim 1, in which the base is formed with apertures and markings to facilitate alignment with features on the mounting surface.

8. Trunking according to claim 1, in which the base is an extruded plastics part of channel cross-section formed with means to locate cables or conduits at least temporarily in position, until the cover is fitted.

* * * * *